UNITED STATES PATENT OFFICE.

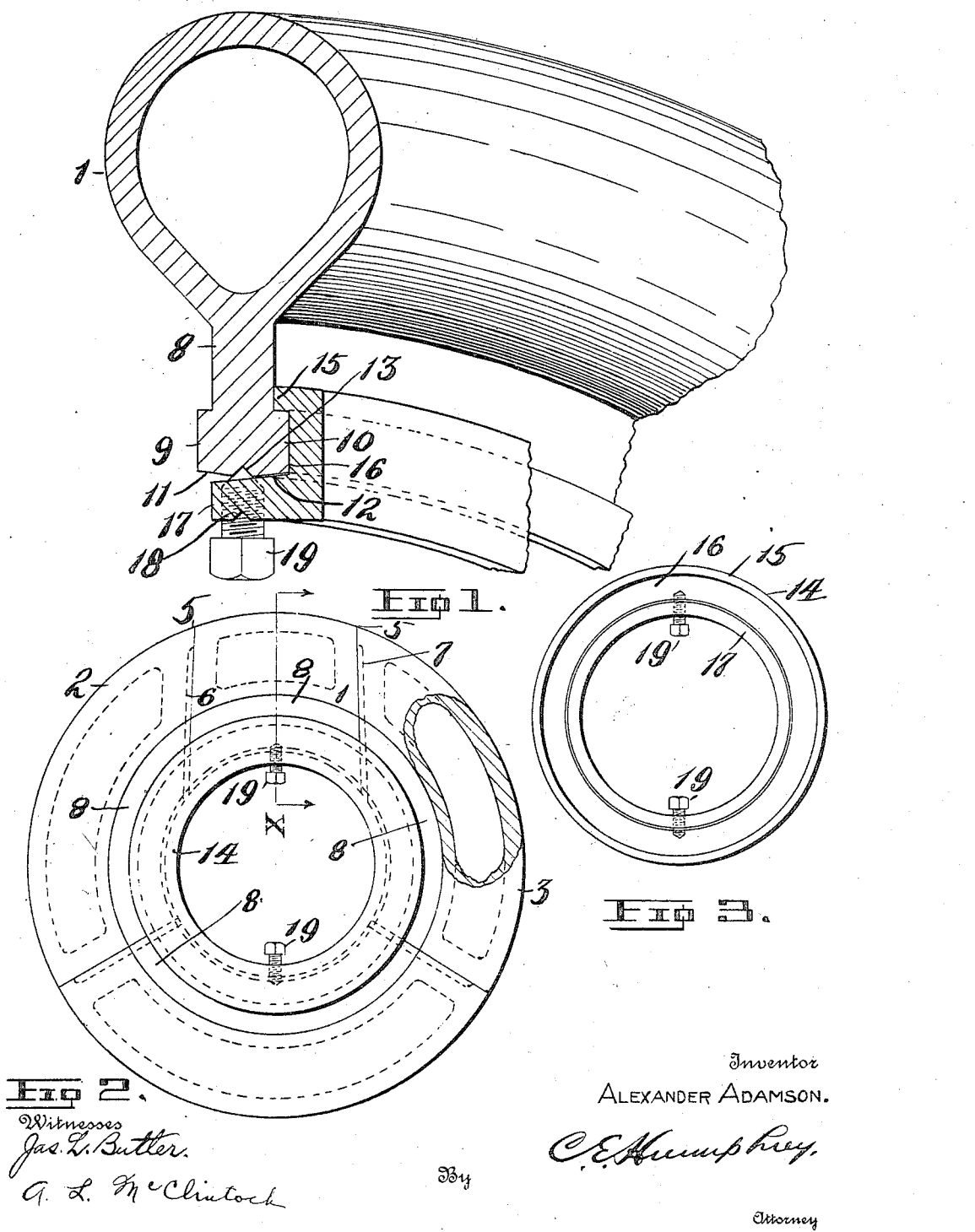

ALEXANDER ADAMSON, OF AKRON, OHIO.

COLLAPSIBLE CORE.

1,124,381.  Specification of Letters Patent.  Patented Jan. 12, 1915.

Application filed March 25, 1914. Serial No. 827,087.

*To all whom it may concern:*

Be it known that I, ALEXANDER ADAMSON, a citizen of the United States, residing at Akron, in the county of Summit and State of Ohio, have invented new and useful Improvements in Collapsible Cores, of which the following is a specification.

This invention relates to improvements in collapsible cores used for manufacturing outer tire shoes of double-tube pneumatic tires, and the object thereof is to provide a simple, quick-acting and efficient device for uniting the several segmental portions which are used to form the core, said device being positive in action, extremely durable in use, and one in which the locking device is capable of being reversed in position, so that if one side of the core flanges become worn from constant use, the hard steel locking device, which does not usually wear out as rapidly, can be applied to the other side of the flanges, thereby prolonging the life and usefulness of a device embodying this invention.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a combined sectional and perspective view of a portion of a core showing my locking device in operative engagement therewith. Fig. 2, is a plan view of a core assembled and showing the locking device in connection therewith; and, Fig. 3, is a plan view of the locking device detached from the core.

A ring-core embodying this invention is customarily constructed of a plurality of segmental-shaped members, which when united together, as hereinafter described, constitute an annulus, the outer and lateral faces of which are adapted to impart a preferred configuration to the corresponding inner face of the tire shoe which is to be manufactured thereon. The segments which are employed to form the core are designated in the drawings by the reference numerals 1, 2, 3 and 4. It is customary in forming these segment-shaped members, to make them hollow to reduce the weight of the entire core, and with the ends of each segment closed, so that when the segments are assembled in abutting relation they form a complete annulus. The lines of severance 5 between the ends of the segment 1 and the segment-shaped members 2 and 3 are so inclined that the member is wedge-shaped constituting a key for a purpose to be later described. The ends of contiguous sections are alternately provided with grooves 6 and the opposing ends of members are provided with keys 7 adapted to be received in the grooves 6 and to constitute interlocking means for preventing lateral movement of the various segment-shaped members when they are in assembled relation. All of the members are provided with inwardly-extending narrow flanges 8, provided at their inner edges with laterally-extending ribs or projections 9 and 10 extending circumferentially and as all these flanges and ribs 9 and 10 are identical they are adapted to abut against each other when the members are assembled to form the complete core. The inner faces of the ribs 9 are provided with beveled portions 11 and 12 forming an obtuse angle and at the line of union between them there is provided a circumferentially-extending V-shaped recess 13 for a purpose to be later described.

The locking device employed for holding the various segmental-shaped members in assembled relation comprises a single ring 14 provided at its outer portion with a laterally projecting flange 15 inwardly of which is a circumferentially-extending recess or groove 16. The inner portion of the member comprises a flange 17 which is wider than the flange 15 and the outer face thereof, by which is meant the face which opposes or is opposite to the flange 15, is inclined with an inclination approximately parallel to the beveled faces 11 and 12 of the flanges 8. The inner face of the flange 17 is provided with a circumferentially-extending V-shaped recess 18 for a purpose to be later described. The flange 17 is further provided with one or more radially-extending threaded openings in which are positioned screws or bolts 19 preferably having their outer ends conically fashioned.

In setting up a core embodying this invention, the parts are assembled and the last member positioned is the key-forming member 1. After effecting substantial alinement, although perfect alinement is not absolutely necessary, the locking member is placed over the outer faces of each one of the ribs 9 or 10 of the flange 8 and as the ring is forced to place the inclined outer face of the flange 17 engaging either of the beveled faces 11 and 12, sets up a wedging action, tending to force all of the members into perfect alinement by forcing the outer shoulders of the ribs 9 and 10 outwardly against the inner face of the flange 15 which constitutes an abutment therefor and by the time the ring has been properly set, all of the segmental-shaped members have been arranged in perfect annular alinement. In order to hold the locking ring 14 against displacement while in use, the screws 19 are run out so that their conical outer ends will engage in the V-shaped recess 13 in the inner faces of the segment-shaped members, thereby effectually holding the interlocking rings from being displaced. When it is necessary to mount the assembled core on a chuck to build up a tire shoe thereon, the three triangularly-positioned arms of the chuck which have sharpened outer termini, engage in the V-shaped recess 18 in the inner face of the locking member 14, so that the locking-ring 14 will not interfere with the placing of a tire on the chuck for the tire-shoe-building operation.

I claim:—

1. A core of the character described comprising a plurality of independent segment-shaped sections having interengaging ends and inwardly-extending flanges, said flanges provided with ribs at their inner lateral portion, the inner faces of said flanges and ribs being inclined, and an integral endless locking ring having one portion adapted to lap the side faces of said flanges on one side of the core and the other portion of said ring provided with an inclined face to engage the inner faces of said flanges and ribs and arranged when positioned to set up a wedging action for forcing said sections into registration, and radially-moving means carried by said ring for holding it detachably in position.

2. A core of the character described comprising a plurality of independent segment-shaped sections having interengaging ends and inwardly-extending flanges, said flanges provided with ribs at their inner lateral portions, the inner faces of said flanges and ribs being inclined, an endless locking ring L-shaped in cross section, one portion of which is adapted to overlap the lateral faces of the flanges on one side of the core and the other portion provided with an inclined face to coact with the inner faces of said flanges and ribs for holding said sections in circumferential registration, and radially-acting means carried by said ring and engaging said core sections for holding the former in position.

3. A core of the character described comprising a plurality of independent segment-shaped sections having interengaging ends and inwardly-extending flanges, said flanges provided with ribs at their inner lateral portions, the inner faces of said flanges and ribs being inclined, an endless locking ring L-shaped in cross section, one portion of which is adapted to overlap the lateral faces of the flanges on one side of said core and interengage with the outer faces of said ribs, the other portion of said ring provided with an inclined outer face to wedgingly engage the inner faces of said flanges and ribs for holding the sections in circumferential registration, and radially-acting means carried by said ring for holding it in position.

4. A core of the character described comprising a plurality of separable sections having inwardly-extending flanges provided at their inner portions with circumferentially-extending enlargements, the inner face of the enlargements being inclined in opposite directions forming an obtuse angle, a circumferentially-extending recess positioned centrally of the flanges, and a locking-ring provided with a groove, one of the side walls of which is inclined to engage with one of the inclined inner faces of said flanges, whereby when said ring is positioned and the inclined complemental portions of the ring and sections abut, the sections are held in assembled relation, and radially-acting means carried by said locking ring engaging in said circumferential recess for holding said locking ring against displacement.

5. A core of the character described comprising a plurality of separable sections having inwardly-extending flanges provided at their inner portions with circumferentially-extending enlargements, the inner faces of the enlargements being inclined in opposite directions forming an obtuse angle with respect to each other, and a locking ring provided with an annular groove adapted to be applied to the side face of said flanges with one side of the enlargement positioned in said groove, said groove having an inclined wall adapted to abut against one of the inclined faces of said enlargement whereby when said ring is positioned it serves to hold the sections assembled, said locking ring further provided with radially-positioned threaded openings, and screws mounted in said openings adapted when shifted to engage the flanges for holding the locking-ring against displacement.

6. A core of the character described comprising a plurality of separable sections having inwardly-extending flanges provided on opposite sides near their inner edges with laterally-projecting ribs, the outer walls whereof constitute abutments, with the inner faces of said ribs inclined inwardly and also inclined toward each other to form an obtuse angle with respect to one another, and a locking-ring provided with a groove the outer wall of which is arranged at right angles with the floor of the groove and the other wall inclined to engage and co-act with the inclined inner face of said sections whereby when said ring is positioned it serves to hold the sections assembled, and radially-acting means carried by said locking-ring engaging said sections for holding said locking-ring against displacement.

7. A core of the character described comprising a plurality of independent segment-shaped sections having interengaging ends and inwardly-extending flanges, said flanges provided with ribs at their inner lateral portions, the inner faces of said flanges and ribs being inclined, an endless locking ring L-shaped in cross section, one portion of which is adapted to overlap the lateral faces of the flanges on one side of said core and interengaged with the outer faces of said ribs, the other portion of said ring provided with an inclined outer face to wedgingly engage the inner faces of said flanges and ribs for holding the sections in circumferential registration, said inclined portion of said ring provided with a threaded opening, and a screw mounted in said threaded opening adapted to engage the inner face of the core for holding said ring against movement.

In testimony whereof I have hereunto set my hand in presence of two subscribing witnesses.

ALEXANDER ADAMSON.

Witnesses:
C. E. HUMPHREY,
A. L. McCLINTOCK.